(12) United States Patent
Zambrano et al.

(10) Patent No.: US 10,086,925 B2
(45) Date of Patent: Oct. 2, 2018

(54) USE OF AUTOMATIC PITCH CONTROL TO IMPROVE BRAKING PERFORMANCE

(71) Applicant: Embraer S.A., São José dos Campos-SP (BR)

(72) Inventors: Gustavo Jose Zambrano, São José dos Campos (BR); Tiago Francisco Gomes Da Costa, São José dos Campos (BR); Fernando Antonio Pavão, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 0 days.

(21) Appl. No.: 15/209,105

(22) Filed: Jul. 13, 2016

(65) Prior Publication Data

US 2018/0015997 A1   Jan. 18, 2018

(51) Int. Cl.

| | |
|---|---|
| *B64C 13/16* | (2006.01) |
| *B64C 25/34* | (2006.01) |
| *B64C 25/42* | (2006.01) |
| *B64C 25/50* | (2006.01) |
| *B60T 7/04* | (2006.01) |
| *B60T 8/17* | (2006.01) |
| *B64D 45/00* | (2006.01) |
| *B60T 8/32* | (2006.01) |
| *B60T 8/18* | (2006.01) |

(52) U.S. Cl.
CPC ............ *B64C 13/16* (2013.01); *B60T 7/042* (2013.01); *B60T 8/1703* (2013.01); *B60T 8/325* (2013.01); *B64C 25/34* (2013.01); *B64C 25/42* (2013.01); *B64C 25/50* (2013.01); *B64D 45/00* (2013.01); *B60T 8/18* (2013.01); *B60T 2230/03* (2013.01); *B60T 2230/04* (2013.01)

(58) Field of Classification Search
CPC ......... B64C 13/16; B64C 25/42; B64C 25/34; B64C 25/50; B60T 7/042; B60T 8/1703; B64D 45/00
USPC ............................................................. 701/3
See application file for complete search history.

(56) References Cited

U.S. PATENT DOCUMENTS

| | | | | |
|---|---|---|---|---|
| 7,708,223 | B2 * | 5/2010 | Mathieu .................. | B64C 25/42 244/50 |
| 7,797,095 | B2 * | 9/2010 | Rado ...................... | B60T 8/1703 244/1 R |
| 8,095,300 | B2 * | 1/2012 | Villaume ............... | G01C 23/00 244/182 |
| 8,132,757 | B2 * | 3/2012 | Regis .................... | B64C 25/426 244/110 A |
| 8,346,455 | B2 * | 1/2013 | Rado ...................... | B60T 8/1703 244/1 R |
| 9,348,335 | B2 * | 5/2016 | Gama-Valdez ....... | B60T 8/1703 |
| 2006/0243857 | A1 * | 11/2006 | Rado ..................... | B60T 8/1703 244/111 |
| 2009/0065635 | A1 * | 3/2009 | Regis .................... | B64C 25/426 244/81 |

(Continued)

*Primary Examiner* — Krishnan Ramesh
(74) *Attorney, Agent, or Firm* — Nixon & Vanderhye P.C.

(57) ABSTRACT

A flight control law enhances braking efficiency through the operation of aircraft elevators (or another pitch control system) using measured longitudinal acceleration and/or pedal position as references to the control law. Through this solution, it is possible to increase the vertical load in the main landing gear and consequently enhance braking efficiency.

16 Claims, 2 Drawing Sheets

(56) References Cited

U.S. PATENT DOCUMENTS

| | | | | |
|---|---|---|---|---|
| 2009/0065636 A1* | 3/2009 | Mathieu | ............ | B64C 13/16 244/87 |
| 2009/0150011 A1* | 6/2009 | Villaume | ............ | G01C 23/00 701/3 |
| 2011/0144875 A1* | 6/2011 | Rado | ............ | B60T 8/1703 701/70 |
| 2015/0301531 A1* | 10/2015 | Gama-Valdez | ............ | B60T 8/1703 701/3 |

* cited by examiner

USE OF AUTOMATIC PITCH CONTROL TO IMPROVE BRAKING PERFORMANCE

CROSS-REFERENCE TO RELATED APPLICATIONS

None.

STATEMENT REGARDING FEDERALLY SPONSORED RESEARCH OR DEVELOPMENT

None.

FIELD

The technology herein falls within the field of aircraft flight control, and more particularly relates to flight control laws to improve braking performance by use of pitch control systems.

BACKGROUND & SUMMARY

During the braking phase of a landing or rejected take-off of an aircraft, the main source of retarding forces arises from the frictional contact between aircraft tires and the runway surface. These frictional forces are generated by the action of the applied brakes on the main landing gear wheels.

As conventional aircraft typically have brakes only on the main wheels (and not on the nose wheels), a key parameter that influences braking capability is the vertical load acting in the main landing gear during ground deceleration. The greater the vertical load acting on main landing gear, the higher the deceleration forces that the brakes can provide to slow and stop the aircraft.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE NON-LIMITING EMBODIMENTS

Figure 1:
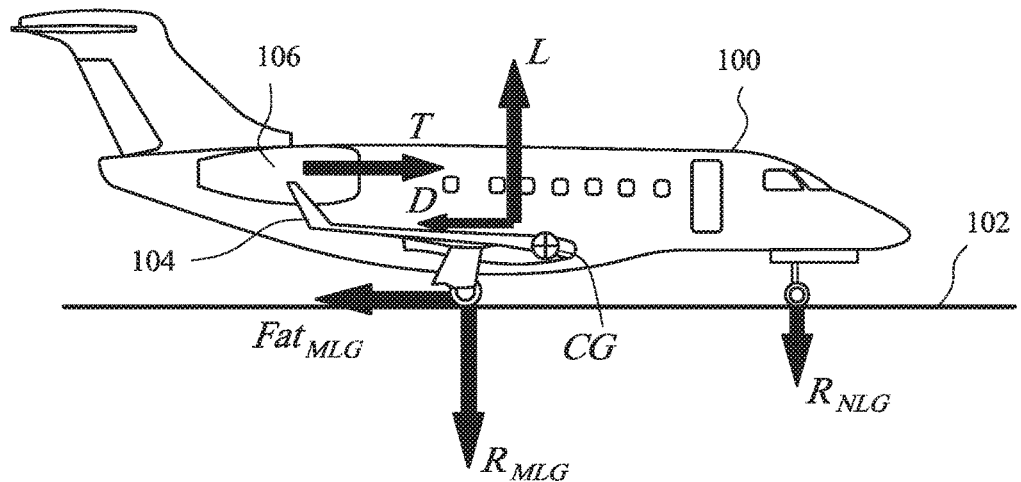
FIG. 1 illustrates the forces acting in an airplane during a braking segment.

FIG. 1 illustrates forces acting in an airplane 100 during a braking segment. This diagram shows that the aircraft 100 moving on the runway 102 is subject to upward lift L from the wings 104, forward thrust T from the engines 106, and aerodynamic drag D. The net vertical load acting on the entire aircraft 100 is the resultant from aircraft lift L and weight W. The individual vertical loads $R_{MLG}$, $R_{NLG}$, respectively, acting on the main landing gears 11, and on nose landing gear 13 are a result of a vertical load distribution between the nose landing gear of the aircraft and the main landing gear. The braking force $Fat_{MLG}$ exerted by the wheels of the main landing gear 11 generates a nose-down rotational moment, which decreases the local load on the main landing gear 11 and increases the load on the nose landing gear 13. As a result, the brake efficiency is reduced by the nose-down pitch moment generated by braking forces.

This example non-limiting technology provides a solution to solve the braking efficiency problem described above.

One example non-limiting embodiment provides a flight control law that enhances braking efficiency through the operation of aircraft elevators 108 (or another pitch control system) using measured longitudinal acceleration and/or brake pedal position as references to the control law. Through this solution, it is possible to increase the vertical load in the main landing gear 11 and consequently enhance braking efficiency.

Using the example non-limiting approach, it is possible to adjust the relationship between acceleration and/or brake pedals with elevator 108 deflection to always keep at least a minimum vertical load on the nose landing gear 13 to provide adequate directional handing qualities during take-off and landing. There is no requirement to directly measure instantaneous vertical load on nose gear 13. This solution provides a simple and reliable system because the measured deceleration and brake pedal position parameters are, in general, already used by fly-by-wire control laws and already have the necessary reliability.

Figure 2:
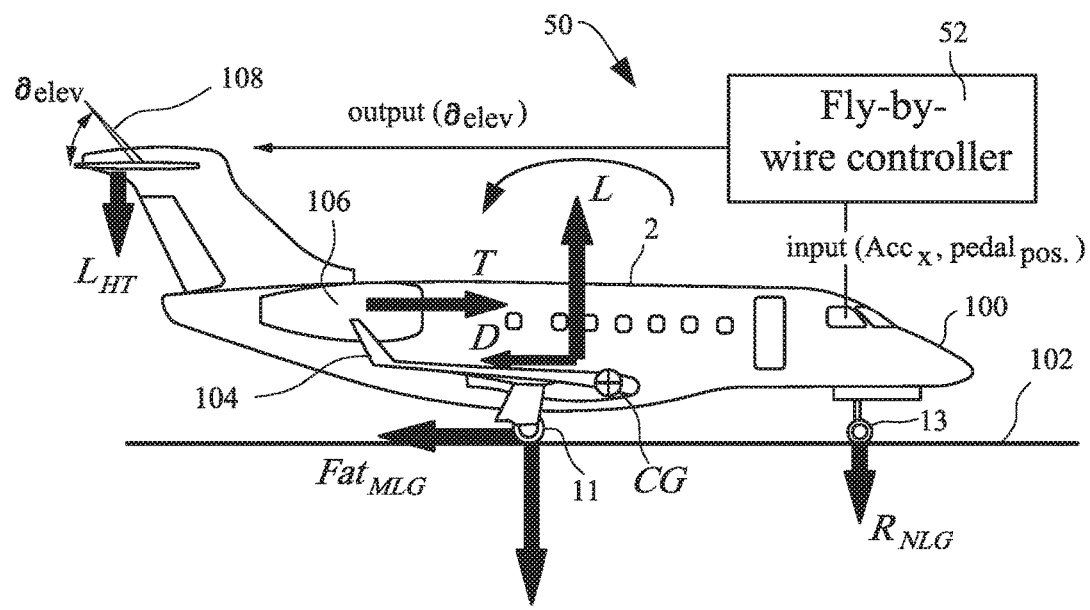
FIG. 2 illustrates forces acting in an airplane during braking and an example non-limiting control law scheme.

In more detail, FIG. 2 shows an example control system 50 including a fly-by-wire controller 52 (which may be one or more processors executing software stored in non-transitory memory) that implements a control law. In particular, the controller 52 receives an input $Acc_x$ indicating the longitudinal acceleration (e.g., negative acceleration, or deceleration, measured by a conventional linear accelerometer or other acceleration measuring sensor) and the brake pedal position ($pedal_{pos}$) from a conventional brake pedal position sensor. Controller 52 may also receive a speed signal from a pilot tube or other sensor that measures speed of the aircraft. The controller 52 does not require a measurement of nose loading or force as an input.

In response to some or all of these inputs, the controller 52 produces an output $\delta_{elev}$ which is applied to change the position of the elevator 108 or other pitch-control-surface. Controller 52 outputs a parameter $\delta_{elev}$ to control a rear control surface (e.g., an elevator 108) which generates a rear downward lift force $L_{HT}$. Downward lift force $L_{HT}$ executes a rotational moment on the aircraft that at least partially counteracts the nose-down moment generated by brake forces on the main landing gear 11. This countervailing moment has the effect of increasing the local load on the main landing gear 11 and decreasing the load on the nose landing gear 13.

Figure 3:
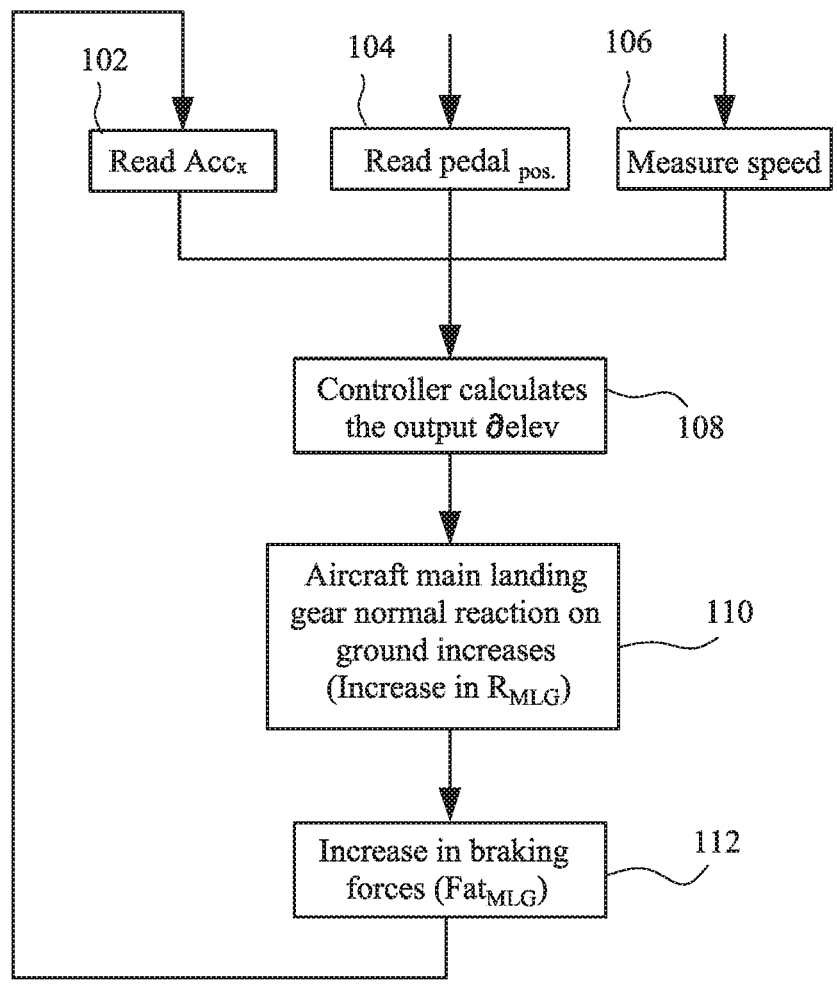
FIG. 3 shows an example control law executed by the fly-by-wire controller.

FIG. 3 shows example non-limiting control law steps performed by controller 52. In this example, controller 52 reads acceleration (block 102), brake pedal position (block 104) and speed (block 106). The controller 52 calculates the parameter $\delta_{elev}$ from one, some or all of these parameters to control a rear control surface 108 as discussed above (block 108). This results in increasing the aircraft main landing gear's 11 normal vertical load $R_{MLG}$ toward the ground (block 110), and increasing braking forces $Fat_{MLG}$ correspondingly (block 112). The process is repeated continually by repetitively reading acceleration (block 102), brake pedal position (block 104) and speed (block 106) and repetitively performing the calculations and steps of blocks 108, 110 and 112.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A system for improving braking efficiency of an aircraft having an elevator or other rear pitch control surface, the system comprising:
an acceleration sensor that measures longitudinal deceleration of the aircraft;
a brake pedal sensor that measures position of a brake pedal; and
a controller coupled to the acceleration sensor and/or the brake pedal sensor, the controller implementing a flight control law that enhances braking efficiency of the aircraft through the operation of the elevator or other pitch control surface by using measured longitudinal deceleration and/or pedal position as references to the control law, to thereby selectively controlling deflection of the elevator or other pitch control surface to generate negative lift as a function of measured longitudinal deceleration and/or sensed applied brake pedal that increases the vertical load in the main landing gear and consequently enhances the braking efficiency of the aircraft.

2. The system of claim 1 wherein the aircraft includes a nose wheel that has no associated brakes.

3. The system of claim 1 wherein the acceleration sensor comprises a linear accelerometer.

4. The system of claim 1 wherein the controller outputs a signal to change the position of the elevator or other pitch control surface in response to the measured longitudinal deceleration and/or brake pedal position.

5. The system of claim 1 wherein the controller produces an open loop output that controls the control surface to at least partially counteract the nose-down moment generated by main landing gear brakes, the nose-down moment having the effect of decreasing the local load on the main landing gear and increasing the load on nose landing gear.

6. The system of claim 5 wherein the controller adjusts the relationship between acceleration and/or brake pedals with control surface deflection to always keep at least a minimum vertical load on the nose landing gear to provide adequate directional handing qualities during take-off and landing.

7. The system of claim 1 wherein the system does not directly measure instantaneous vertical load on nose landing gear.

8. The system of claim 1 wherein the controller outputs a parameter $\delta_{elev}$ to control the control surface which generate a rear downward lift force $L_{HT}$, and the downward lift force $L_{HT}$ executes a rotational moment on the aircraft that at least partially counteracts the nose-down moment generated by brake forces on the main landing gear to thereby increase the local load on the main landing gear and decreasing the load on nose landing gear.

9. A method for improving braking efficiency of an aircraft including main landing gear having brakes, nose landing gear, and an elevator or other rear pitch control surface, the method comprising:
measuring longitudinal deceleration of the aircraft;
measuring position of a brake pedal; and
using at least one processor, implementing a flight control law that enhances braking efficiency of the aircraft through the operation of the pitch control surface by using the measured longitudinal deceleration and/or pedal position as references to the control law,
thereby controlling deflection of the pitch control surface to generate negative lift as a function of measured longitudinal deceleration and/or sensed applied brake pedal that selectively increases the vertical load in the main landing gear.

10. The method of claim 9 wherein the nose landing gear includes a nose wheel that has no brakes.

11. The method of claim 9 further including outputting, with the at least one processor, a signal to command the position of the control surface in response to the measured longitudinal deceleration and/or brake pedal position.

12. The method of claim 9 further including producing, with the at least one processor, an output that controls the control surface to at least partially counteract a nose-down moment generated by the main landing gear brakes, the nose-down moment having the effect of decreasing the local load on the main landing gear and increasing the load on the nose landing gear.

13. The method of claim 9 further including adjusting, with the at least one processor, the relationship between acceleration and/or brake pedal with control surface deflection to always keep at least a minimum vertical load on the nose landing gear to provide adequate directional handing qualities during take-off and landing.

14. The method of claim 9 further including not directly measuring instantaneous vertical load on the nose landing gear.

15. The method of claim 9 further including outputting, with the at least one processor, a parameter $\delta_{elev}$ to command the control surface to generate a rear downward lift force $L_{HT}$, the downward lift force $L_{HT}$ executing a rotational moment on the aircraft that at least partially counteracts the nose-down moment generated by brake forces on the main landing gear to thereby increase the local load on the main landing gear and decreasing the load on the nose landing gear.

16. An aircraft comprising:
a fuselage;
main landing gear having brakes controlled by a brake pedal;
nose landing gear;
an elevator or other rear pitch control surface;
a first sensor that measures longitudinal deceleration;
a second sensor that measures position of the brake pedal;
a third sensor that measures speed; and
at least one processor configured to generate and output a control parameter δelev in response to at least one of the first, second and third sensors, the control parameter being applied to control the elevator or other rear pitch control surface deflection as a function of measured longitudinal acceleration and/or sensed applied brake pedal to generate a rear downward negative lift force LHT in an amount to provide a rotational moment on the aircraft that at least partially counteracts a nose-down moment generated by brake forces on the main landing gear to thereby increase the local load on the main landing gear and decrease the local load on the nose landing gear.

* * * * *